(12) United States Patent
Matsumura et al.

(10) Patent No.: US 8,280,115 B2
(45) Date of Patent: Oct. 2, 2012

(54) IMAGE PROCESSING APPARATUS AND IMAGE PROCESSING METHOD

(75) Inventors: Dai Matsumura, Machida (JP); Kaname Tomite, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 12/259,425

(22) Filed: Oct. 28, 2008

(65) Prior Publication Data
US 2009/0110291 A1 Apr. 30, 2009

(30) Foreign Application Priority Data

Oct. 30, 2007 (JP) ................................ 2007-282352
Jul. 17, 2008 (JP) ................................ 2008-186501

(51) Int. Cl.
*G06K 9/00* (2006.01)
(52) U.S. Cl. ......... 382/107; 382/284; 345/633; 345/634
(58) Field of Classification Search .................. 382/107, 382/164, 173, 284; 345/629, 632, 633, 634
See application file for complete search history.

(56) References Cited

U.S. PATENT DOCUMENTS

| | | | | |
|---|---|---|---|---|
| 6,798,897 B1 * | 9/2004 | Rosenberg | ................ | 382/107 |
| 7,212,687 B2 | 5/2007 | Ohshima | ................ | 382/284 |
| 2001/0024533 A1 * | 9/2001 | Kriegman | ................ | 382/284 |
| 2003/0002730 A1 * | 1/2003 | Petrich | ................ | 382/154 |

FOREIGN PATENT DOCUMENTS

| | | |
|---|---|---|
| JP | 2003-296759 A | 10/2003 |
| JP | 2004-096679 A | 3/2004 |
| JP | 2005-202653 A | 7/2005 |

OTHER PUBLICATIONS

Jun. 11, 2012 Japanese Office Action, issued in Japanese Patent Application No. 2008-186501.

* cited by examiner

*Primary Examiner* — Andrew W Johns
(74) *Attorney, Agent, or Firm* — Cowan, Liebowitz & Latman, P.C.

(57) ABSTRACT

A key region extraction unit (303) extracts a first region including pixels having a predetermined pixel value in a physical space image. A motion vector detection unit (304) calculates motion vectors at a plurality of portions on the physical space image. An object region detection unit (305) specifies, using the motion vectors, a second region to be merged with the first region. When superimposing a virtual space image on the physical space image, an image composition unit (308) excludes a composition region obtained by merging the first region with the second region from a virtual space image superimposition target.

12 Claims, 16 Drawing Sheets

IMAGE PROCESSING APPARATUS AND IMAGE PROCESSING METHOD

BACKGROUND OF THE INVENTION

1. Field of the Invention

The present invention relates to a technique of compositing a physical space image with a virtual space image.

2. Description of the Related Art

There is conventionally proposed a mixed reality (MR) technique which superimposes a computer graphics (CG) on real scenery and presents the image to a user to make him/her feel as if the virtual objects were actually present in that scene.

To give the user a more realistic feeling by using the MR technique, simply superimposing a CG on real scenery does not suffice. It is also important to ensure interaction that allows the user to (have a bodily sensation to) actually touch or manipulate a virtual object rendered by CG. To implement the interaction, it is necessary to display, e.g., a user's hand (object) that manipulates a virtual object in front of (on the foreground of) the virtual object. This is because if the object that should be placed in front of the virtual object is hidden by the virtual object, the sense of distance to the virtual object or the sense of reality breaks down so no realistic feeling can be obtained.

To solve this problem, the present applicant has proposed, in patent reference 1, a technique of preventing a virtual object from hiding an object image that should be placed on the foreground. This technique acquires the real photo image of an object and background, and extracts, from the real photo image as an object region, "an object that should be displayed in front of a virtual object (a region having color information serving as object detection information)", which has been registered in the system manually in advance. Virtual object rendering is inhibited in the object region. This technique enables the user to have a realistic MR experience because the object that should exist on the foreground is displayed in front of the virtual object without being hidden by it.

FIG. 1 is a view showing examples of a physical space image, a virtual space image, and a composition image obtained by superimposing the virtual space image on the physical space image.

Referring to FIG. 1, a physical space image 101 includes hand regions 150 as objects. A virtual space image 102 is superimposed on the physical space image 101. A composition image 103 is obtained by superimposing the virtual space image 102 on the physical space image 101. In generating the composition image 103, the virtual space image 102 is not superimposed on the hand regions 150 in the physical space image 101. As a result, the hand regions 150 are rendered without being processed.

[Patent reference 1] Japanese Patent Laid-Open No. 2003-296759

The mixed reality experience system disclosed in patent reference 1 excellently operates if the object observed by the user is of a single color. However, if the object has a plurality of different colors, some parts of the object are isolated in the CG because CG rendering can be inhibited only in a region having a predetermined color. This may impair the realistic feeling for the user.

FIG. 2 is a view showing examples of a physical space image including objects having a plurality of colors, a virtual space image, and a composition image obtained by superimposing the virtual space image on the physical space image.

Referring to FIG. 2, a physical space image 201 includes hand regions 150a and arm regions 150b as objects. The regions 150a and 150b have different colors. A virtual space image 202 is superimposed on the physical space image 201. A composition image 203 is obtained by superimposing the virtual space image 202 on the physical space image 201. In this case, only regions having the color of the hand regions 150a are excluded from the superimposition target of the virtual space image 202. For this reason, the virtual space image 202 is rendered in the arm regions 150b where superimposition of the virtual space image 202 should be inhibited, as shown in FIG. 2.

The above-described technical background brings the following demand. A user's hand or a designated region is extracted from a real photo image. Then, a region (e.g., user's arm) attached to the extracted region is also extracted. The virtual space image is superimposed on the physical space image except in an object region (hand and arm) defined by merging the extracted regions.

SUMMARY OF THE INVENTION

The present invention has been made in consideration of the above-described problems, and has as its object to provide a technique of appropriately setting a region where no virtual space image should be superimposed.

According to the first aspect of the present invention, an image processing apparatus comprises:
 a unit which acquires a physical space image;
 an extraction unit which extracts a first region including pixels having a predetermined pixel value in the physical space image;
 a calculation unit which calculates a motion vector of an object in the physical space image;
 a specifying unit which specifies, using the motion vector, a second region that moves together with the first region;
 a generation unit which generates a virtual space image; and
 a superimposition unit which superimposes the virtual space image on a region different from the first region and the second region in the physical space image.

According to the second aspect of the present invention, an image processing method comprises:
 a step of acquiring a physical space image;
 an extracting step of extracting a first region including pixels having a predetermined pixel value in the physical space image;
 a calculating step of calculating a motion vector of an object in the physical space image;
 a specifying step of specifying, using the motion vector, a second region that moves together with the first region;
 a generating step of generating a virtual space image; and
 a superimposing step of superimposing the virtual space image on a region different from the first region and the second region in the physical space image.

According to the third aspect of the present invention, a computer-readable storage medium storing a computer program which causes a computer to execute:
 a step of acquiring a physical space image;
 an extracting step of extracting a first region including pixels having a predetermined pixel value in the physical space image;
 a calculating step of calculating a motion vector of an object in the physical space image;
 a specifying step of specifying, using the motion vector, a second region that moves together with the first region;
 a generating step of generating a virtual space image; and
 a superimposing step of superimposing the virtual space image on a region different from the first region and the second region in the physical space image.

Further features of the present invention will become apparent from the following description of exemplary embodiments with reference to the attached drawings.

DESCRIPTION OF THE EMBODIMENTS

The preferred embodiments of the present invention will now be described in detail with reference to the accompanying drawings. Note that the embodiments will be described as examples of preferred arrangements of the present invention described in the appended claims, and the present invention is not limited to the embodiments to be described below.

First Embodiment

In this embodiment, when superimposing a virtual space image on a physical space image including a "hand" region and an "arm" region, the regions are merged to generate one object region (composition region). Superimposition processing is controlled such that the object region is always displayed in front of the virtual space image. Although details will be described later, the object region is not limited to the region obtained by merging the "hand" region and the "arm" region and can be formed by merging any other regions. That is, any object region is applicable in the following explanation if it is expressed by a plurality of pixel values.

Figure 4:
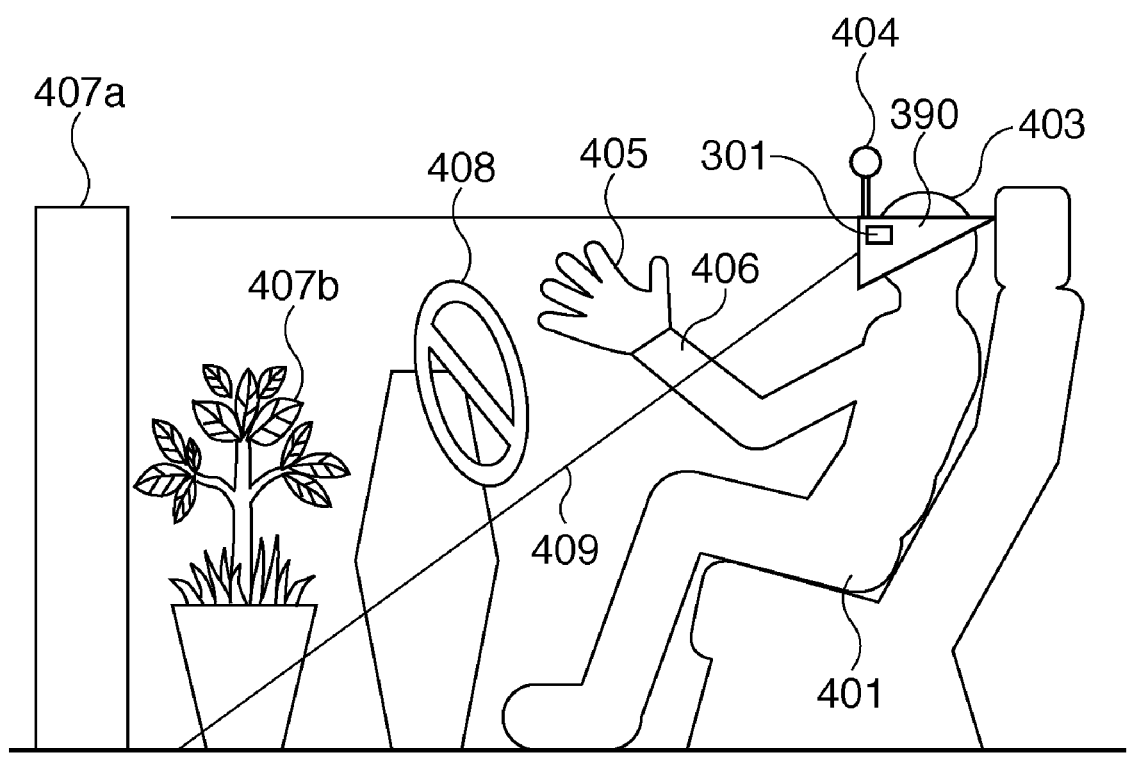
FIG. 4 is a view showing a state in which a user observes, via an HMD, a composition image generated by superimposing a virtual space image on a physical space image.

FIG. 4 is a view showing a state in which a user observes, via an HMD, a composition image generated by superimposing a virtual space image on a physical space image.

As shown in FIG. 4, a user 401 observes, via an HMD 390, a composition image (mixed reality space image) obtained by superimposing a virtual space image generated based on the measurement result of a sensor 404 on a physical space image sensed by an image sensing unit 301. When a hand 405 and an arm 406 of the user enter a virtual field range 409 of the image sensing unit 301 during observation, the hand 405 and the arm 406 are displayed in the mixed reality space image displayed on the HMD 390. That is, the virtual space image (part of a virtual object 408) is not superimposed on the physical space image in the regions of the hand 405 and arm 406 as the foreground. To implement this, the regions are distinguished so that "the region of the hand 405 and the region of the arm 406 of the user 401" are defined as physical objects to be placed on the foreground, whereas "background physical objects 407 such as a wall and potted plants" are defined as physical objects to be placed on the background.

Figure 3:
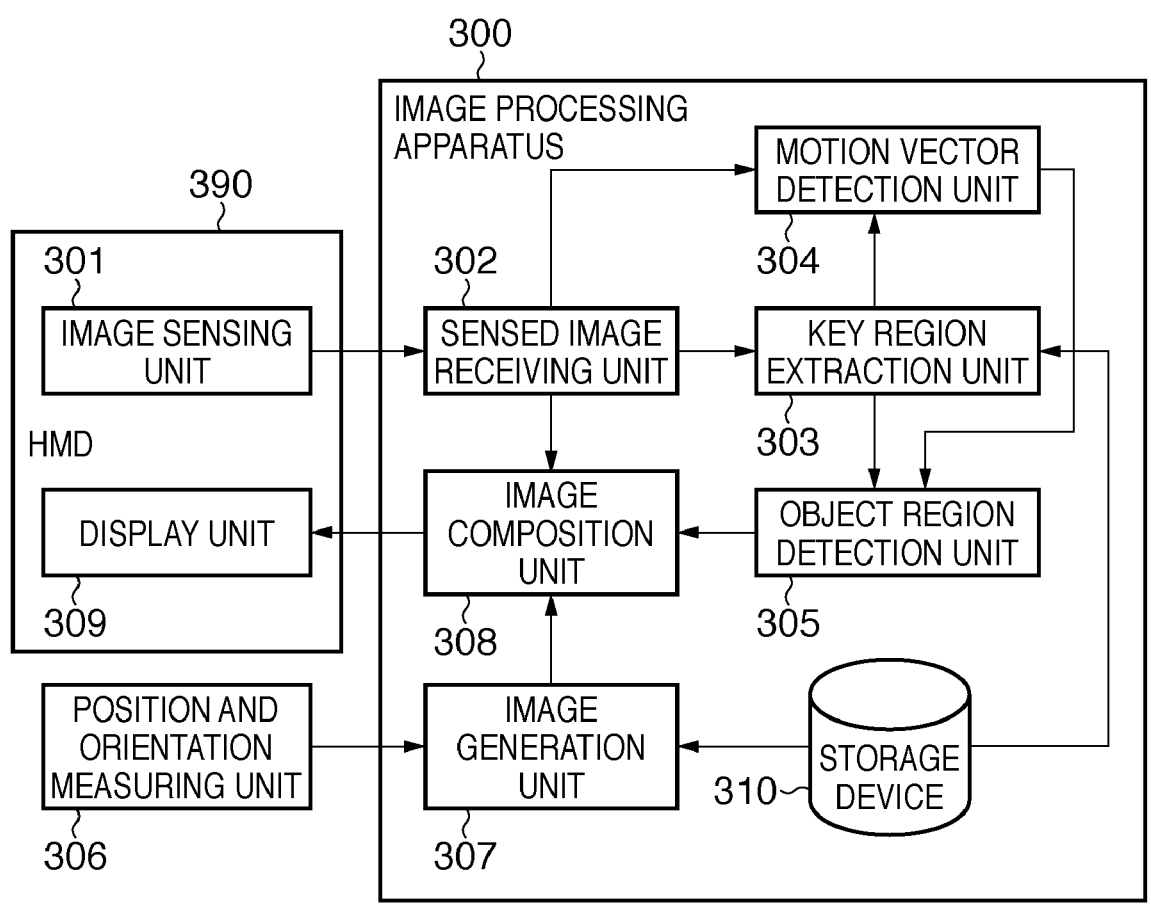
FIG. 3 is a block diagram showing an example of the functional arrangement of a system according to the first embodiment of the present invention.

FIG. 3 is a block diagram showing an example of the functional arrangement of a system according to this embodiment.

As shown in FIG. 3, the system according to this embodiment includes the HMD 390, a position and orientation measuring unit 306, and an image processing apparatus 300. The HMD 390 and the position and orientation measuring unit 306 are connected to the image processing apparatus 300.

The HMD 390 will be described.

The HMD 390 is an example of a head mounted display device and includes the image sensing unit 301 and a display unit 309.

The image sensing unit 301 is a video camera which senses a movie of physical space. Each sensed frame image (physical space image) is input to the image processing apparatus 300 of the succeeding stage as an image signal. The image sensing unit 301 is attached to the HMD 390 to be located near the user's eyes when he/she wears the HMD 390 on the head. The attachment orientation (of the image sensing unit 301) almost matches the front direction (line-of-sight direction) of the user who wears the HMD 390 on the head. This allows the image sensing unit 301 to sense a movie of physical space seen from the position and orientation of the user's head. Hence, the image sensing unit 301 will sometimes be called a "user's viewpoint" in the following explanation.

The display unit 309 includes, e.g., a liquid crystal panel and is attached to the HMD 390 so as to be located in front of the eyes of the user who wears the HMD 390 on the head. An image based on an image signal output from the image processing apparatus 300 to the HMD 390 is displayed on the display unit 309. Hence, the image based on the image signal transmitted from the image processing apparatus 300 is displayed in front of the eyes of the user who wears the HMD 390 on the head.

In this embodiment, the HMD 390 incorporates the image sensing unit 301 and the display unit 309. The image sensing unit 301 and the display unit 309 are incorporated in the HMD 390 such that the optical system of the display unit 309 matches the image sensing system of the image sensing unit 301.

The position and orientation measuring unit 306 will be described next.

The position and orientation measuring unit 306 measures the position and orientation of the image sensing unit 301. A sensor system such as a magnetic sensor or an optical sensor is applicable to the position and orientation measuring unit 306. For example, when a magnetic sensor is applied to the position and orientation measuring unit 306, it operates in the following way.

When a magnetic sensor is applied to the position and orientation measuring unit 306, it includes the following components.

- A transmitter which generates a magnetic field in the neighborhood
- A receiver which detects a change in the magnetic field generated by the transmitter in accordance with the position and orientation of its own in the magnetic field
- A sensor controller which controls the operation of the transmitter and also generates the position and orientation information of the receiver in the sensor coordinate system on the basis of the measurement result of the receiver The transmitter is arranged at a predetermined position in physical space. The receiver is attached to the image sensing unit 301. When the transmitter generates a magnetic field, the receiver detects a change in the magnetic field according to the position and orientation of its own (the position and orientation of the image sensing unit 301) and outputs a signal representing the detection result to the sensor controller. Based on the signal, the sensor controller generates position and orientation information representing the position and orientation of the receiver in the sensor coordinate system. The sensor coordinate system has its origin at the position of the transmitter. Three axes perpendicularly intersecting each other at the origin are defined as the x-, y-, and z-axes. The sensor controller outputs the calculated position and orientation information to the image processing apparatus 300 of the succeeding stage.

However, any other sensor system is applicable to the position and orientation measuring unit 306. The operation of the position and orientation measuring unit 306 is known independently of the applied sensor system, and a description thereof will be omitted. Instead of using a sensor system, the position and orientation of the image sensing unit 301 may be calculated using an image sensed by the image sensing unit 301. In this case, the position and orientation measuring unit 306 is omitted, and an arithmetic processing unit for executing the method is provided in the image processing apparatus 300 of the succeeding stage.

The image processing apparatus 300 will be described next. As shown in FIG. 3, the image processing apparatus 300 includes a sensed image receiving unit 302, key region extraction unit 303, motion vector detection unit 304, object region detection unit 305, image composition unit 308, image generation unit 307, and storage device 310. The units included in the image processing apparatus 300 will be described below.

Upon receiving the image signal of each frame image output from the image sensing unit 301, the sensed image receiving unit 302 sequentially converts the signal into digital data and outputs it to the motion vector detection unit 304, key region extraction unit 303, and image composition unit 308.

The key region extraction unit 303 extracts a key region (first region) from the physical space image represented by the digital data received from the sensed image receiving unit 302. The key region is a region formed from pixels having a predetermined pixel value. In this embodiment, a region formed from pixels having a pixel value representing the color of the user's hand is defined as the key region. The key region extraction unit 303 generates key region data that is data to specify the key region in the physical space image and outputs the generated key region data to the object region detection unit 305.

The motion vector detection unit 304 calculates, for each pixel of the physical space image of the current frame, the motion vector between frames using the physical space image (current frame) received from the sensed image receiving unit 302 and the physical space image of the immediately preceding frame. The data of the motion vector calculated for each pixel is output to the object region detection unit 305.

The motion vector detection unit 304 can detect the motion vector by calculating an optical flow by an existing block matching method. In this embodiment, the motion vector detection (calculation) is done by block matching. However, the present invention to be described below is not limited to the method, and any other method capable of detecting the motion vector between frames is usable. For example, the motion vector detection may be done using an optical flow by a gradient method.

The object region detection unit 305 extracts the region of an object (object region) in the physical space image using the key region data received from the key region extraction unit 303 and the motion vector data received from the motion vector detection unit 304. The object region is obtained by merging the regions of the user's hand and arm, as described above. Object region data that is data to specify the extracted object region is output to the image composition unit 308.

The image generation unit 307 first forms virtual space using virtual space data held in the storage device 310. The virtual space data contains the data of each virtual object to be arranged in the virtual space and the data of a light source to be arranged in the virtual space. If a virtual object is formed from polygons, the data of the virtual object contains the normal vector data of the polygons, the color data of the polygons, and the coordinate position data of each vertex of the polygons. When texture mapping is necessary for a virtual object, texture mapping data is also contained in the data of the virtual object. The light source data contains, e.g., data representing the type of light source and data representing the layout position and orientation of the light source.

After forming the virtual space, the image generation unit 307 sets a viewpoint in the virtual space at the position and orientation represented by the position and orientation information received from the position and orientation measuring unit 306. The image generation unit 307 generates an image of the virtual space (virtual space image) viewed from the viewpoint. The technique of generating a virtual space image seen from a viewpoint having a predetermined position and orientation is known, and a description thereof will be omitted. The data of the generated virtual space image is output to the image composition unit 308.

The image composition unit 308 superimposes the virtual space image represented by the data received from the image generation unit 307 on the physical space image represented by the digital data received from the sensed image receiving unit 302. In this superimposition processing, superimposition of the virtual space image is inhibited in the object region represented by the object region data received from the object region detection unit 305. The image composition unit 308 converts the mixed reality space image generated by the superimposition processing into an image signal and outputs it to the display unit 309 of the HMD 390. The mixed reality space image according to the position and orientation of the user's viewpoint is presented in front of the eyes of the user who wears the HMD 390 on the head. In this mixed reality space image, the virtual space image is not superimposed on the object region (the region of the user's hand and arm).

In this embodiment, the mixed reality space image is output to the display unit 309 of the HMD 390. However, the mixed reality space image output destination is not particularly limited. For example, a display device including a CRT or a liquid crystal panel may be connected to the image processing apparatus 300 so that the mixed reality space image is output to the display device.

The storage device 310 holds virtual space data, as described above. The image generation unit 307 reads out and uses the data as needed. The storage device 310 also stores and holds the data (key color data) of the pixel value representing the color of the user's hand.

The key color data will be explained. The key color data can be described as a coordinate vale in a multidimensional color space. There are various well-known color systems such as RGB, YIQ, YCbCr, YUV, HSV, Lu*v*, and La*b* (JIS Color Handbook published by Japanese Standards Association).

Key color data can arbitrarily use an appropriate color system in accordance with the color characteristic of the object. However, to cancel the change in the color characteristic of the object caused by the difference of illumination conditions, preferably, a color system that separates color information into luminance information and hue information is used, and only the hue information is used. Typical color systems are YIQ and YCbCr. This embodiment uses the YCbCr color system. Hence, the key color data stored and held in the storage device 310 is obtained by acquiring the color of the user's hand in advance and converting the acquired color into data on the YCbCr color system.

A series of processes of causing the image processing apparatus 300 to generate a mixed reality space image and output the generated mixed reality space image to the display unit 309 of the HMD 390 will be described with reference to FIG. 5 which shows the flowchart of the processing.

In step S501, the sensed image receiving unit 302 acquires a physical space image output from the image sensing unit 301 as digital data.

In step S502, the key region extraction unit 303 extracts a key region (first region) from the physical space image acquired by the sensed image receiving unit 302 in step S501. The key region extraction unit 303 generates key region data that is data to specify the key region in the physical space image acquired by the sensed image receiving unit 302 in step S501 and outputs the generated key region data to the object region detection unit 305.

The motion vector detection unit 304 calculates, for each pixel of the physical space image of the current frame, the motion vector between frames using the physical space image of the current frame acquired by the sensed image receiving unit 302 in step S501 and the physical space image of the immediately preceding frame. The motion vector detection unit 304 outputs the data of the motion vector calculated for each pixel to the object region detection unit 305.

The object region detection unit 305 extracts an object region in the physical space image acquired by the sensed image receiving unit 302 in step S501 using the key region data generated by the key region extraction unit 303 and the motion vector data generated by the motion vector detection unit 304. The object region detection unit 305 generates, as the object region data, data of a mask image which masks the object region in the physical space image acquired by the sensed image receiving unit 302 in step S501. In this embodiment, the object includes the user's hand and arm, as described above. Hence, a region where the hand and arm exist is extracted from the physical space image, and a mask image is generated from the region. The process in step S502 will be described later in detail.

In step S503, the image generation unit 307 acquires position and orientation information from the position and orientation measuring unit 306. The position and orientation information represents the position and orientation of the viewpoint of the user who wears the HMD 390 on the head, i.e., the position and orientation of the image sensing unit 301, as described above.

In step S504, the image generation unit 307 reads out virtual space data from the storage device 310 and forms virtual space based on the readout data. After forming the virtual space, the image generation unit 307 sets a viewpoint in the virtual space at the position and orientation represented by the position and orientation information acquired from the position and orientation measuring unit 306 in step S503. The image generation unit 307 generates an image of the virtual space (virtual space image) viewed from the viewpoint.

In step S505, the image composition unit 308 superimposes the virtual space image generated by the image generation unit 307 in step S504 on the physical space image represented by the digital data acquired by the sensed image receiving unit 302 in step S501. In this superimposition processing, superimposition of the virtual space image is inhibited in the object region represented by the object region data generated by the object region detection unit 305 in step S502. The process in step S505 will be described later in detail.

In step S506, the image composition unit 308 converts the mixed reality space image generated by the superimposition processing in step S505 into an image signal and outputs it to the display unit 309 of the HMD 390.

If an instruction to end the processing is input by the user via the operation unit (not shown) of the image processing apparatus 300, or the end condition of the processing is satisfied, the processing ends via step S507. If neither an instruction to end the processing is input by the user via the operation unit (not shown) of the image processing apparatus 300, nor the end condition of the processing is satisfied, the process returns from step S507 to step S501. The process from step S501 is performed to output the mixed reality space image of the next frame to the display unit 309.

Figure 6:
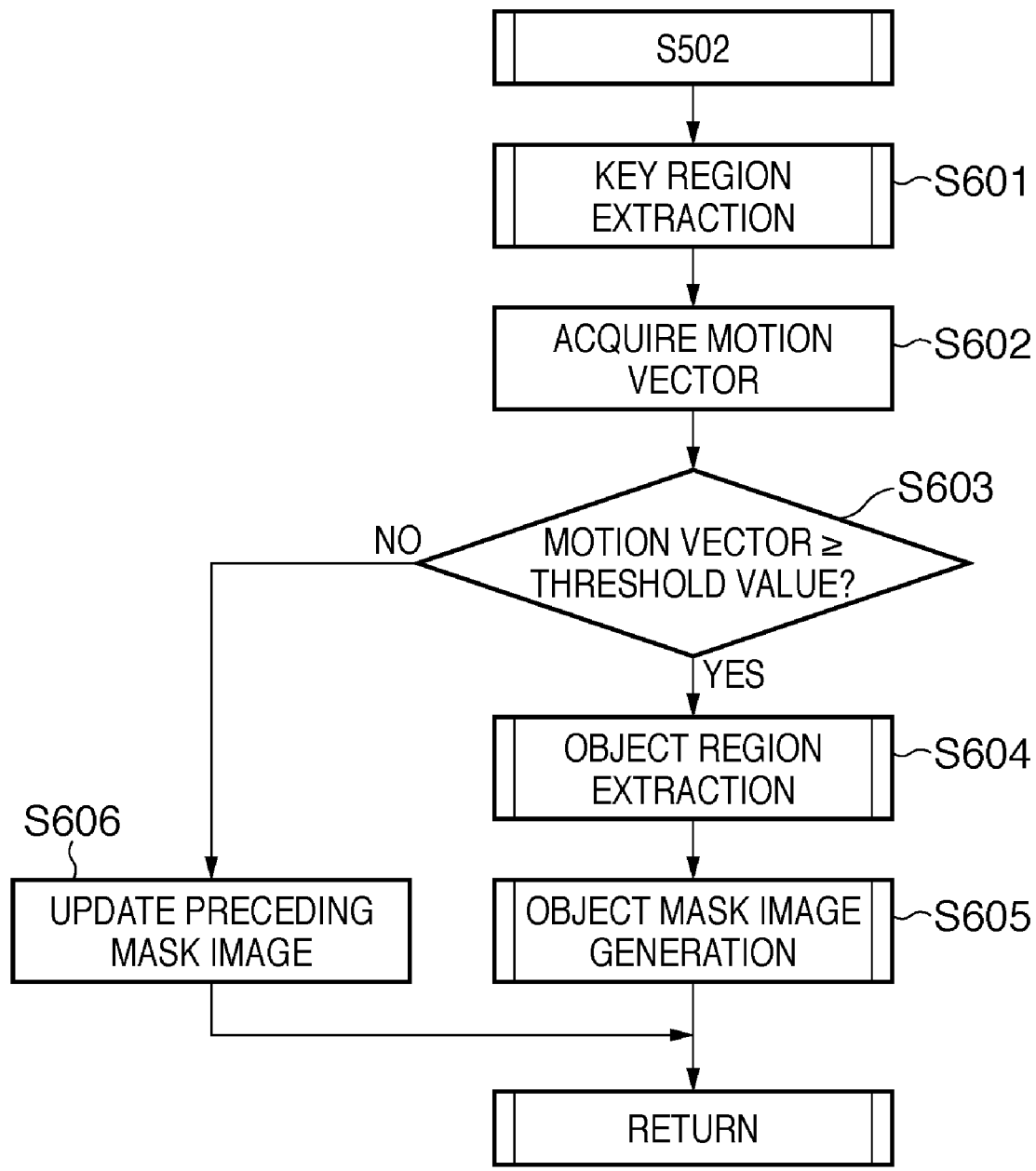
FIG. 6 is a flowchart illustrating details of the process in step S502.

Details of the process in step S502 will be described. FIG. 6 is a flowchart illustrating details of the process in step S502.

In step S601, the key region extraction unit 303 reads out key color data from the storage device 310. The key region extraction unit 303 extracts, as the key region, a set of pixels having the pixel value represented by the key color data read out from the storage device 310 from the pixels of the physical space image acquired by the sensed image receiving unit 302 in step S501.

More specifically, the key region extraction unit 303 assigns "1" to each pixel having the pixel value represented by the key color data read out from the storage device 310 out of the pixels of the physical space image acquired by the sensed image receiving unit 302 in step S501. On the other hand, the key region extraction unit 303 assigns "0" to each pixel which does not have the pixel value represented by the key color data read out from the storage device 310 out of the pixels of the physical space image acquired by the sensed image receiving unit 302 in step S501. That is, "1" is assigned to each pixel included in the hand region of the physical space image, and "0" is assigned to each pixel included in the remaining regions.

Figure 7:
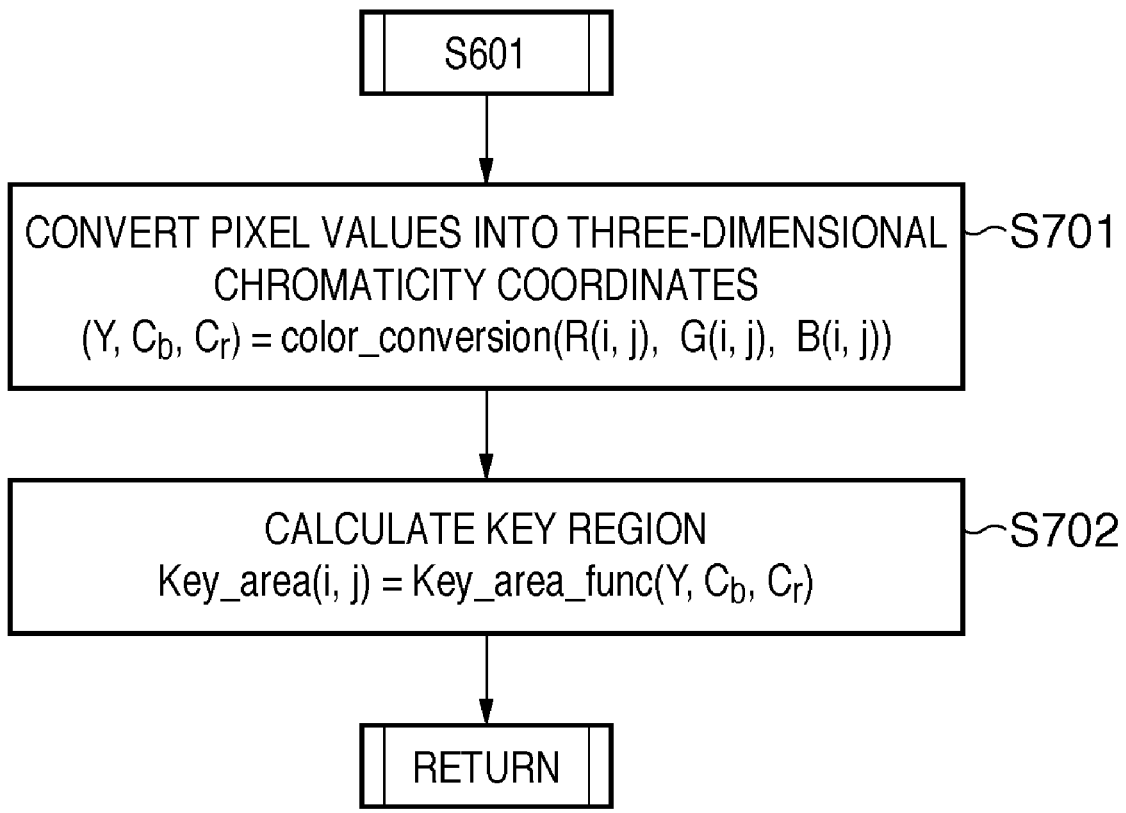
FIG. 7 is a flowchart illustrating details of the process in step S601.

The process in step S601 will be described in more detail. FIG. 7 is a flowchart illustrating details of the process in step S601. The flowchart in FIG. 7 shows a process executed for a pixel at image coordinates (i,j) in the physical space image. Hence, in step S601, the process according to the flowchart in FIG. 7 is executed for each pixel of the physical space image.

In step S701, the key region extraction unit 303 converts the pixel value (expressed by R, G, and B values in this embodiment) of a pixel at image coordinates (i,j) in the physical space image acquired by the sensed image receiving unit 302 in step S501 into Y, Cr, and Cb values. Let R(i,j) be the R value, G(i,j) be the G value, and B(i,j) be the B value of the pixel at the image coordinates (i,j). In this case, in step S701, R(i,j), G(i,j), and B(i,j) are converted using a function color_conversion( ) for converting the R, G, and B values into Y, Cr, and Cb values, thereby calculating the Y, Cr, and Cb values.

In step S702, it is determined whether the color expressed by the Y, Cr, and Cb values calculated in step S701 is almost the same as the color represented by the key color data read out from the storage device 310. For example, it is determined using a function Key_area_func( ) whether the color expressed by the Y, Cr, and Cb values calculated in step S701 is almost the same as the color represented by the key color data read out from the storage device 310. The function Key_area_func( ) returns 1 when the colors are almost the same, and 0 otherwise.

In the determination using the function Key_area_func( ), for example, it is determined whether coordinate values (Cr, Cb) on a CbCr plane defined by Cb and Cr belong to the area of the color distribution of the key color data. The determination result can be expressed by a binary value, and for example, 1 if the coordinate values belong to the color distribution of the key color data, and 0 otherwise. However, the degree of belonging may be expressed by continuous values from 0 to 1.

The value returned by the function Key_area_func( ) is substituted into an array Key_area (i,j). The array Key_area (i,j) stores a value representing whether the pixel at the image coordinates (i,j) is included in the key region.

When the processing of the flowchart in FIG. 7 is executed for all the values i and j, the array Key_area holds "1" or "0" for each pixel of the physical space image. The array Key_area is the key region data.

In this embodiment, the pixel value of each pixel of the physical space image acquired by the sensed image receiving unit 302 is expressed by RGB. However, it may be expressed by YIQ or YUV. In this case, the process in step S701 is omitted, and coordinate values in the IQ space or UV space are used in place of (Cb,Cr) in step S702.

As described above, the key region extraction unit 303 generates key region data representing whether each pixel of the physical space image acquired by the sensed image receiving unit 302 is included in the key region (hand).

Referring back to FIG. 6, in step S602, the motion vector detection unit 304 calculates the motion vector between frames for each pixel of the physical space image of the current frame acquired by the sensed image receiving unit 302 in step S501. In this embodiment, the motion vector is calculated for each pixel of the physical space image. However, the present invention is not limited to this, and calculating the motion vectors of a plurality of points on the physical space image suffices. For example, motion vectors may be calculated for only pixels near the key region. This decreases the time and cost required for calculating the motion vectors.

In step S603, the object region detection unit 305 calculates the average of the magnitudes of motion vectors calculated for the pixels in regions (non-key regions and other regions) except the key region (except the first region) out of the motion vectors of the respective pixels calculated in step S602. It is determined whether the calculated average (the magnitude of a representative motion vector) is equal to or larger than a predetermined threshold value. If it is determined that the calculated average is equal to or larger than the threshold value, the process advances to step S604. If the average is smaller than the threshold value, the process advances to step S606.

The above-described "magnitude of a motion vector" indicates the distance component of a motion vector. The "magnitude" may be calculated based on the angle component of a motion vector. That is, the method of calculating the magnitude of a motion vector is not particularly limited. The significance of the determination process in step S603 will be described.

A region having a high similarity to the motion vector of the hand region is extracted as an arm region. This is implemented because the hand and arm move together in most cases and therefore have similar motion vectors. However, in some cases, only the hand moves, and the arm rarely moves. This occurs, e.g., when the user turns only the wrist. In this case, no arm can be extracted by simply extracting the object region. If neither the hand nor the arm moves at all, and the image sensing unit 301 does not move, no motion vector is calculated. It is therefore impossible to normally extract the object region.

In this embodiment, it is determined in step S603 whether the hand is not moving or whether none of the hand, the arm, and the whole portion of the image sensing unit 301 is moving. More specifically, if the magnitude of the motion vector of the non-key region is almost 0, it is determined that the arm region is not moving, or none of the hand, the arm, and the whole portion of the image sensing unit 301 is moving. In this case, the problem is avoided by executing the process in step S606. The process in step S606 will be described later.

In step S604, the object region detection unit 305 specifies a second region to be merged with the key region based on the key region extracted in step S601 and the motion vector calculated in step S602. The specified second region is merged with the key region to calculate the object region. In this embodiment, the arm region is specified as the second region. The specified arm region is merged with the hand region as the key region, thereby calculating the object region.

Figure 8:
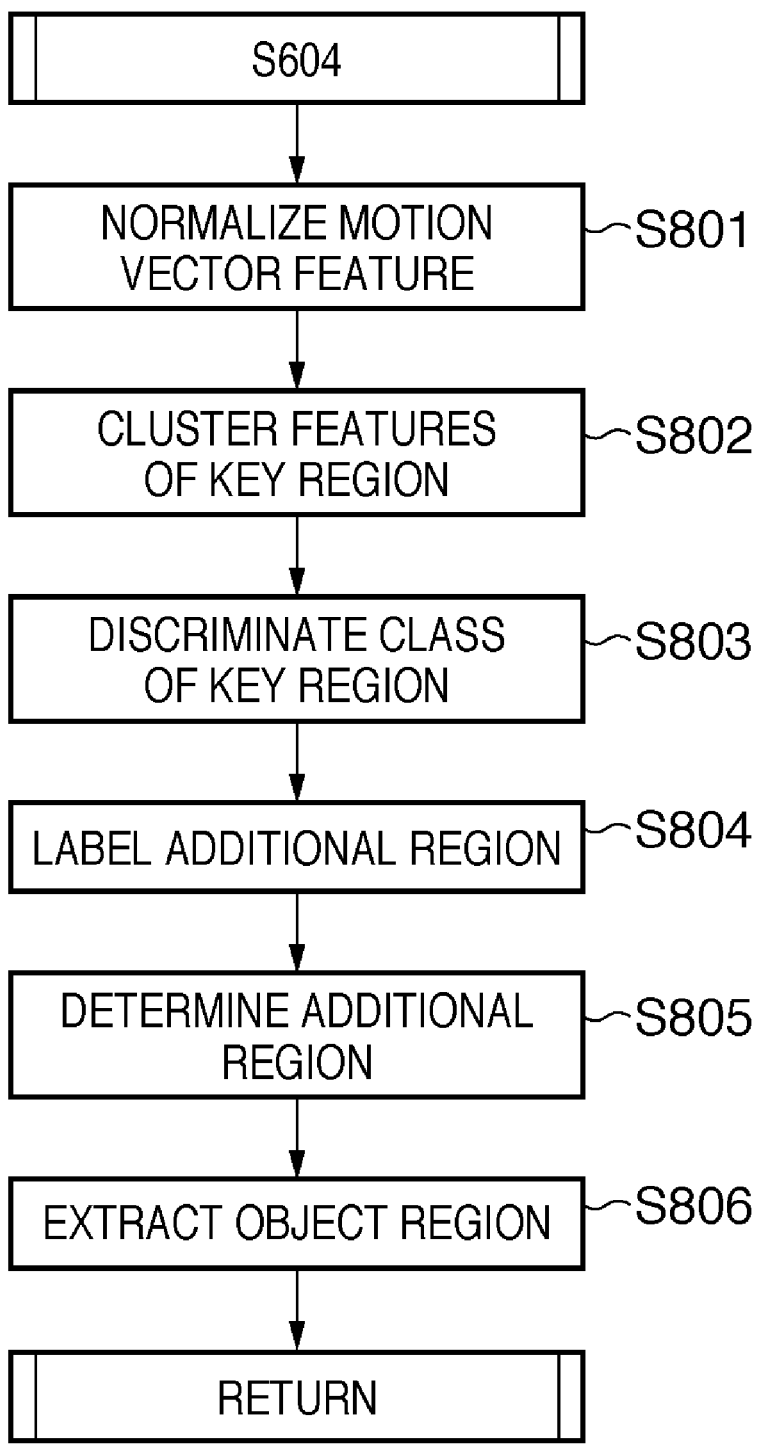
FIG. 8 is a flowchart illustrating details of the process in step S604.

Details of the process in step S604 will be described. FIG. 8 is a flowchart illustrating details of the process in step S604.

In step S801, the object region detection unit 305 normalizes each motion vector by each of the feature axes of the distance component and the angle component. This prevents weighing of each value by the difference of the unit of each feature (general normalization). For example, the normalization is done by minimizing the distance between feature patterns.

Figure 9:
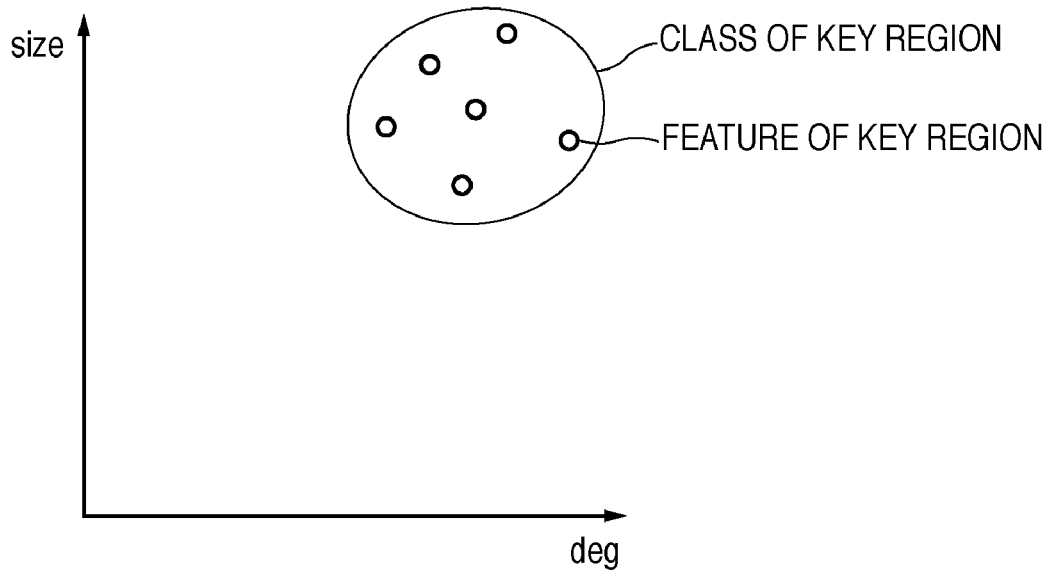
FIG. 9 is a view showing an example of a result obtained by clustering only features of a key region on a feature space.

In step S802, the object region detection unit 305 clusters only the features of the key region on a feature space out of the motion vectors normalized in step S801. That is, the features of the key region are clustered on a feature space defined by the vector distance component axis (ordinate) and the angle component axis (abscissa), as shown in FIG. 9 (learning of a feature pattern). FIG. 9 is a view showing an example of a result obtained by clustering only the features of the key region on the feature space.

Of the clustered features of the key region, the noise component may be excluded as needed. More specifically, a class having a small number of features or a_class having a small distance component is excluded as noise.

In clustering the features of the key region, noise may be excluded by clustering the features of only the edge region of the key region. Edge region extraction can be implemented by an existing labeling algorithm.

Figure 10:
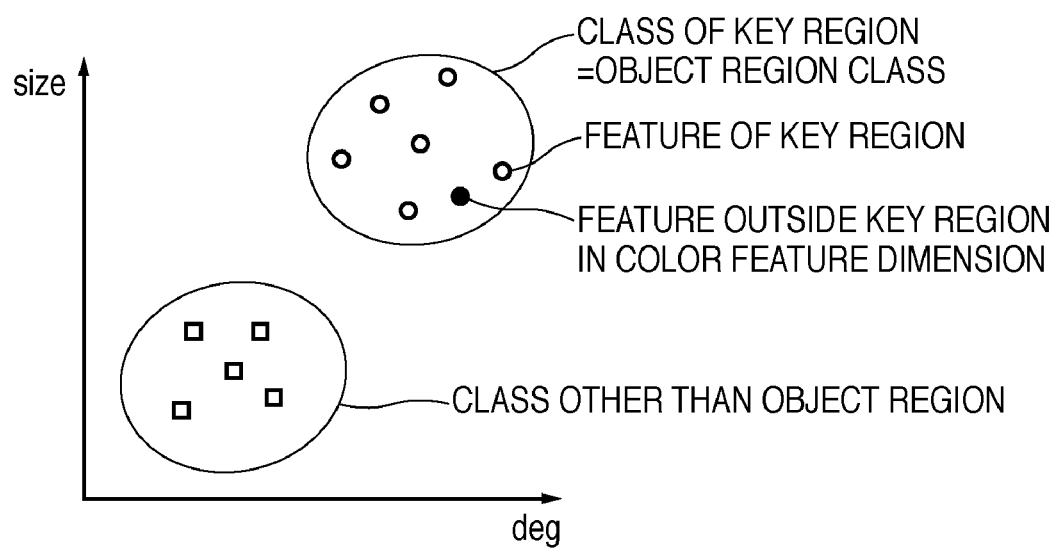
FIG. 10 is a view showing the class of a key region and features belonging to another class.

In step S803, out of the features of all the normalized motion vectors, the object region detection unit 305 includes, in the class of the key region clustered in step S802, features determined as those to be included in the class of the key region. More specifically, features belonging to the class of the key region on the feature space of the motion vectors are regarded as an object region class, thereby discriminating between the object region class and other classes, as shown in FIG. 10. Hence, the object region includes not only the region having the key color data but also a region having a motion vector component similar to the key region. FIG. 10 is a view showing the class of the key region and features belonging to another class.

This process is performed by calculating, e.g., target_area as the object region target_area (i,j)=discriminant_func(whole_vec (i,j))

where (i,j) represents pixel coordinates in the physical space image, discriminant_func( ) is an object region discrimination function learned based on the features of the motion vectors of the class of the key region, and whole_vec is the motion vector of the whole physical space image. As described above, the motion vectors need not always be calculated for all pixels of the physical space image. Hence, the process in step S803 is performed not for all pixels but for all pixels whose motion vectors are calculated.

In step S804, the object region detection unit 305 performs labeling of each pixel specified in step S803 as a pixel having a motion vector component similar to the key region. A region including the labeled pixels will be referred to as an additional region hereinafter. For example, only pixels included in the arm region are labeled. The labeled pixels may include pixels of a region other than the user's hand and arm regions. These pixels should be included in the background region. The region may correspond to, e.g., a hand or arm of a person other than the user.

In step S805, the object region detection unit 305 determines whether the additional region labeled in step S804 is appropriate as an object region. Two criteria are used for the determination in step S805.

The first criterion is whether the additional region is connected to the key region (connection relationship). More specifically, the arm which should be included in the object region is connected to the hand, as a matter of course. Hence, whether the additional region is connected to the key region is determined. If the additional region is connected to the key region, it is determined as the object region. Any region that does not satisfy this condition is excluded from the object region.

The second criterion is whether the additional region belongs to the region of the edge of the physical space image. More specifically, the arm which should be included in the object region is connected to the user, as a matter of course. Hence, when the user is viewing his/her hand, the arm connected to the hand should be connected to the edge of the user's visual field. The arm region should exist in the region of the edge of the image seen by the user. For these reasons, it is determined whether the additional region belongs to the region of the edge of the physical space image. If the additional region belongs to the edge region, it is determined as the object region. Any region that does not satisfy this condition is excluded from the object region.

These processes reduce the error that the background region is recognized as the object region.

To more strictly apply the second criterion, it may be determined whether the additional region belongs to the region of the left, right, or lower edge of the physical space image.

In step S806, the additional region recognized as the object region in step S805 is merged with the key region, thereby forming the object region.

The object region is defined by

Object region=key region+additional region

The additional region is the region determined to be appropriate as the object region in step S805.

The process returns to step S605 in FIG. 6.

In the above description, the distance component and angle component of a motion vector are used as features. However, only the distance component may be used as a feature. More specifically, the component to be used as the feature of a motion vector is not particularly limited. Any feature is usable if it allows to calculate the similarly between motion vectors.

Referring back to FIG. 6, in step S605, the object region detection unit 305 generates, as the object region data, the data of a mask image that masks the object region extracted in step S604 from the physical space image acquired by the sensed image receiving unit 302 in step S501.

Figure 11:
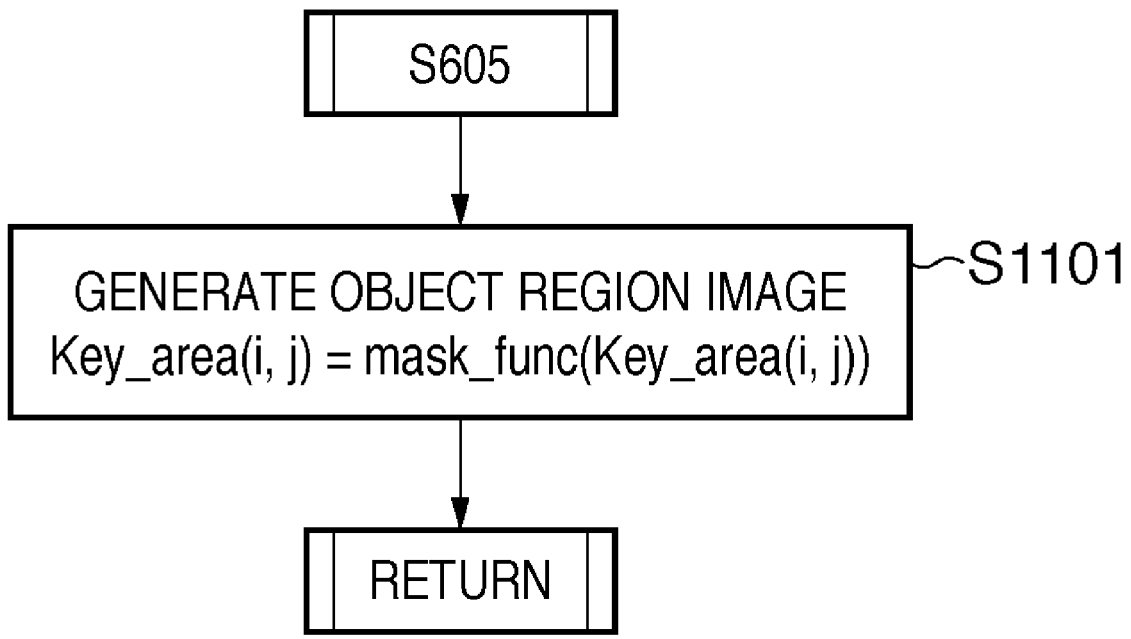
FIG. 11 is a flowchart illustrating details of the process in step S605.

Details of the process in step S605 will be described. FIG. 11 is a flowchart illustrating details of the process in step S605. The flowchart in FIG. 11 shows a process executed for a pixel at image coordinates (i,j) in the physical space image. Hence, in step S605, the process according to the flowchart in FIG. 11 is executed for each pixel of the physical space image.

In step S1101, the object region detection unit 305 writes "1" in the array Key area (i,j) if the pixel at the image coordinates (i,j) is recognized as the object region in step S805. This operation is done by executing a function mask_func( ). The array Key_area (i,j) becomes a two-dimensional array to store a value representing whether the pixel at the image coordinates (i,j) is included in the object region.

When the processing of the flowchart in FIG. 11 is executed for all the values i and j, the array Key_area holds "1" or "0" for each pixel of the physical space image. The array Key_area is the object region data.

In this embodiment, the mask image represented by the object region data may contain noise in the mask region. In this case, existing convex hull processing is performed.

Referring back to FIG. 6, in step S606, the object region detection unit 305 sets to use, in the current frame, the object region data generated for the immediately preceding frame. This is the above-described processing of using the precedingly generated mask image in place of the object region that cannot normally be extracted from the motion vectors. In step S606, however, the object region detection unit may output object region data representing a mask image in which the key region portion is always updated but the additional region is not updated. Always updating the key region portion indicates extracting the region based on the key color data. Hence, this processing guarantees accurate extraction of the key region shape (hand shape) based on the key color data.

Figure 5:
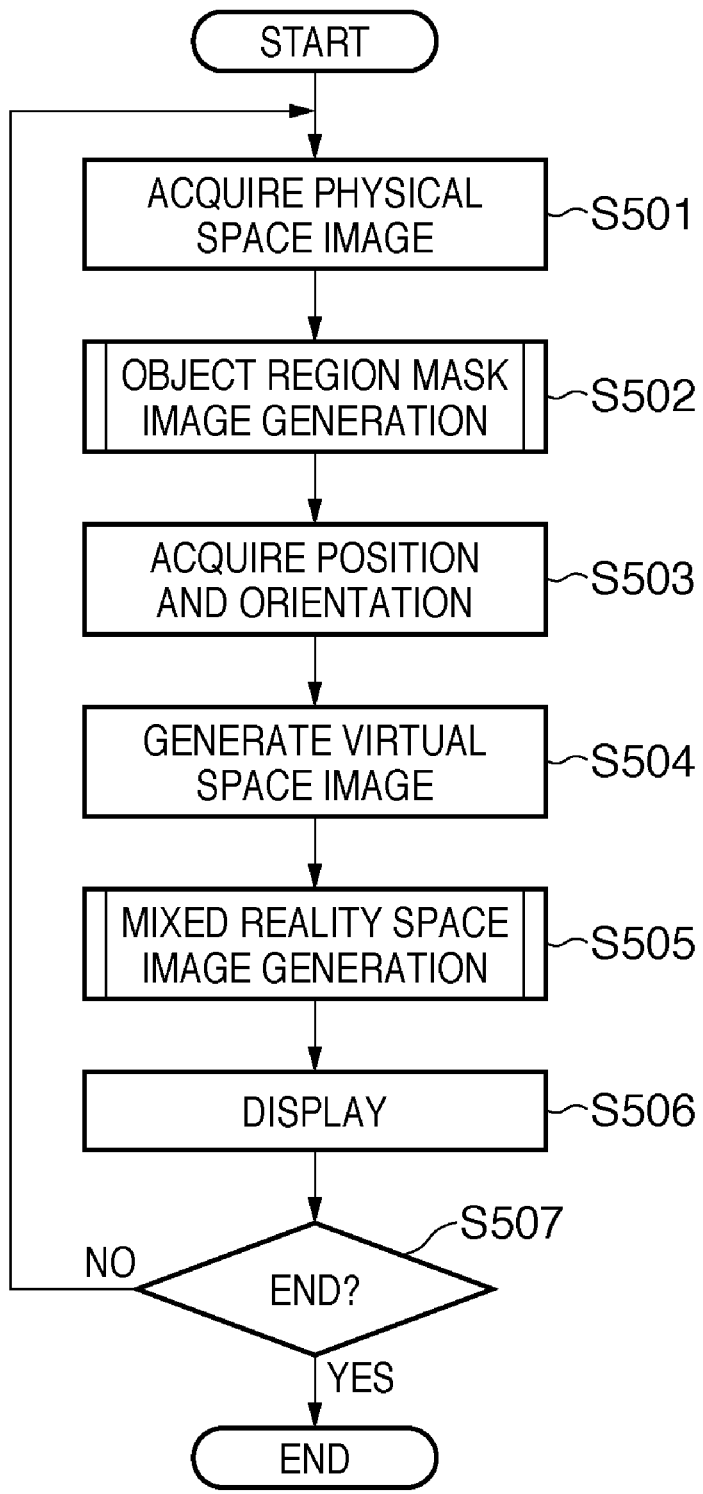
FIG. 5 is a flowchart of a series of processes of causing an image processing apparatus 300 to generate a mixed reality space image and output the generated mixed reality space image to a display unit 309 of an HMD 390.

After the process in step S605 or S606, the process returns to step S503 in FIG. 5.

Figure 12:
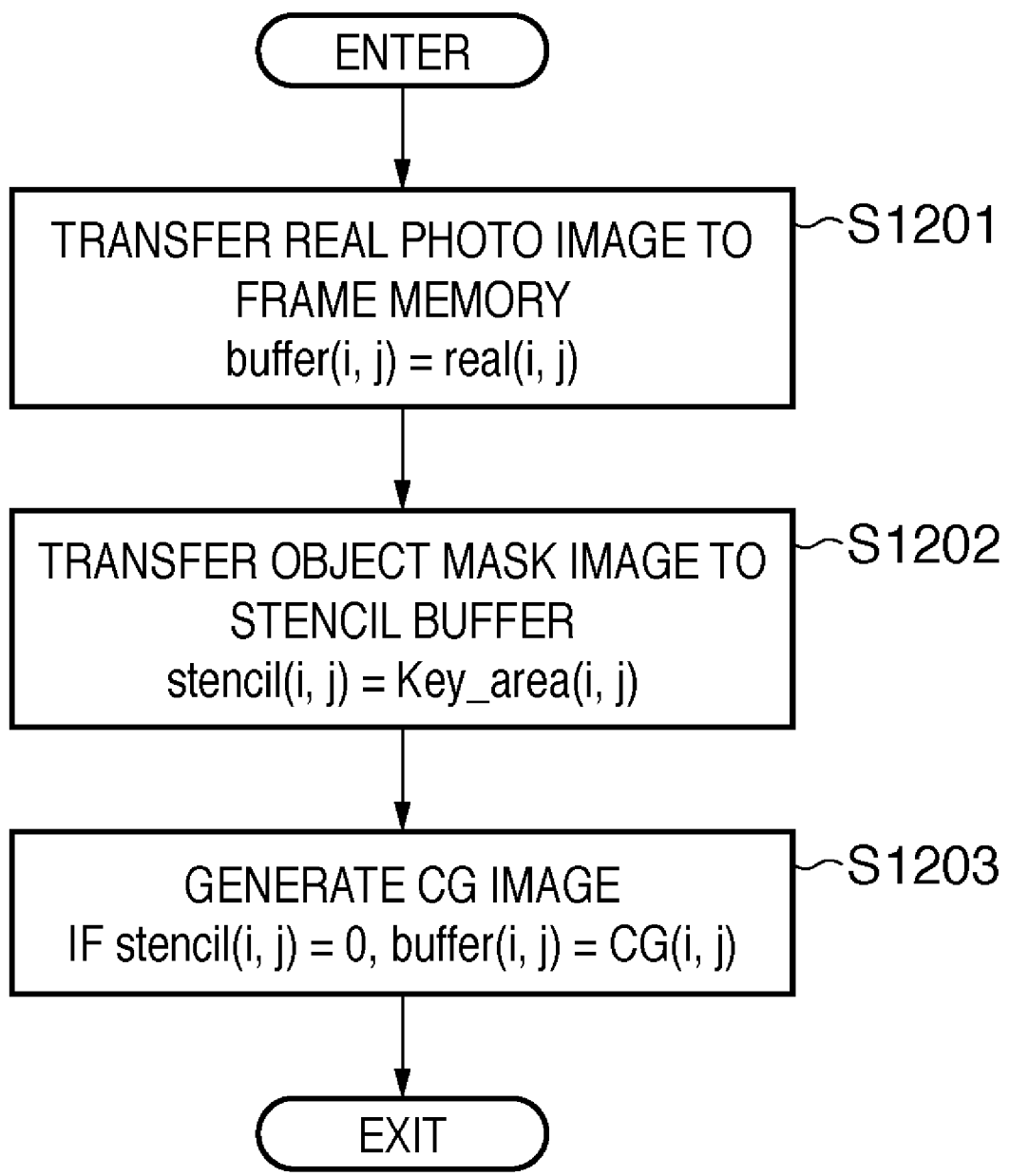
FIG. 12 is a flowchart illustrating details of a mixed reality space image generation process in step S505.

Details of the mixed reality space image generation process in step S505 of FIG. 5 will be described next. FIG. 12 is a flowchart illustrating details of the mixed reality space image generation process in step S505. The flowchart in FIG. 12 shows a process executed for a pixel at image coordinates (i,j) in the mixed reality space image. Hence, in step S505, the process according to the flowchart in FIG. 12 is executed for each pixel of the mixed reality space image.

In step S1201, the image composition unit 308 performs the following process. The image composition unit transfers a pixel real (i,j) at image coordinates (i,j) of the physical space image represented by the digital data acquired by the sensed image receiving unit 302 in step S501 to a frame memory buffer (i,j) in the image processing apparatus 300.

In step S1202, of the mask image represented by the object region data generated in step S502, data Key_area (i,j) corresponding to the image coordinates (i,j) is transferred to a stencil buffer stencil (i,j) in the image processing apparatus 300.

In step S1203, if stencil (i,j)=0, the image composition unit 308 overwrites a pixel CGI (i,j) at the image coordinates (i,j) of the virtual space image generated in step S504 on the frame memory buffer (i,j). If stencil (i,j)=1, the image composition unit 308 performs no processing for the frame memory buffer (i,j). That is, the image composition unit excludes the object region from the virtual space image superimposition target.

When the processing of the flowchart in FIG. 12 is executed for all the values i and j, the mixed reality space image is generated in the frame memory buffer. In step S506, the mixed reality space image is output to the display unit 309 of the HMD 390 as the image signal.

As described above, according to this embodiment, when superimposing a virtual space image on a physical space image, if a "hand" and an "arm" are included as objects in the physical space image, superimposition processing can be controlled to always display the objects on the foreground of the virtual space image.

Figure 1:
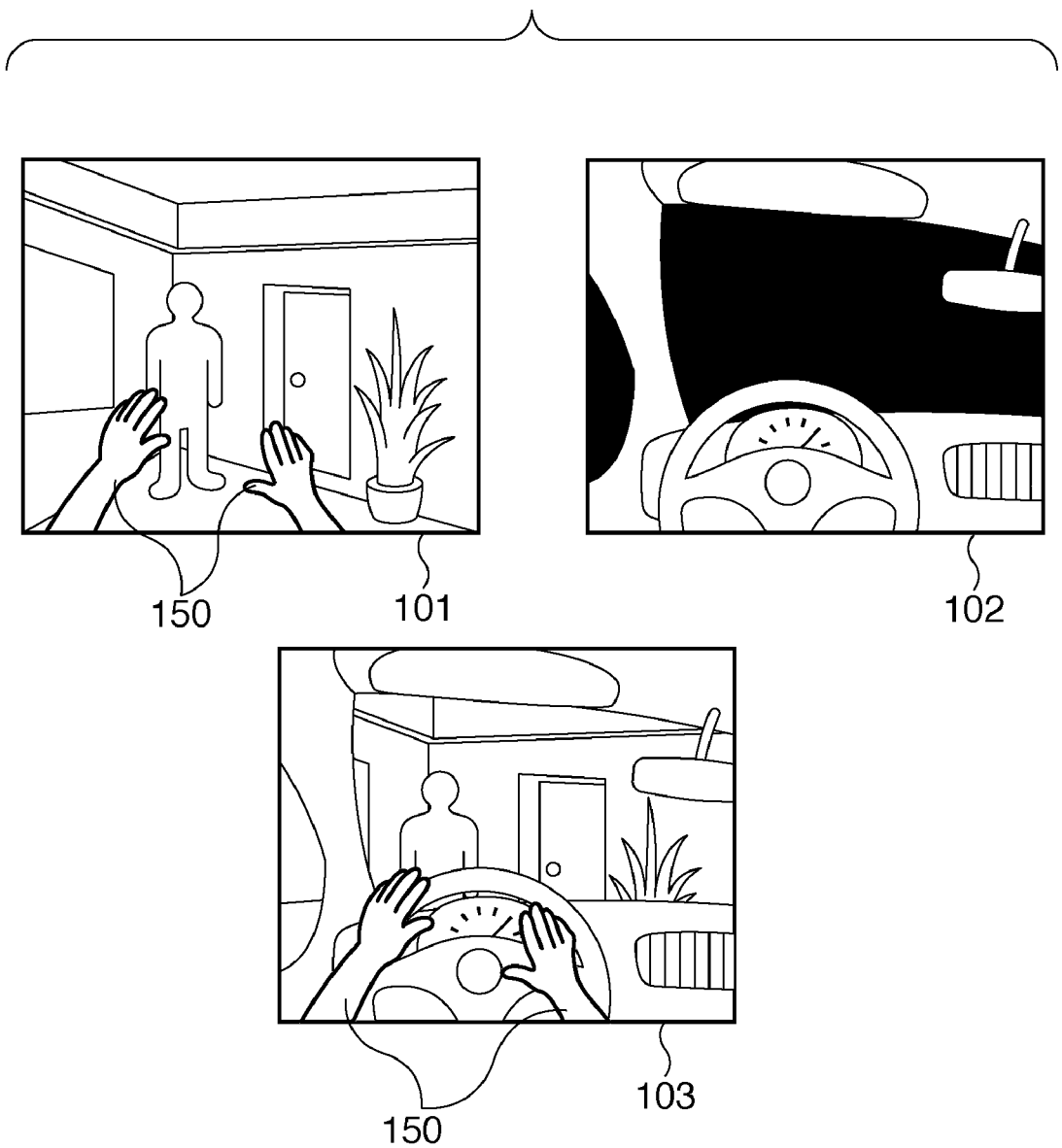
FIG. 1 is a view showing examples of a physical space image, a virtual space image, and a composition image obtained by superimposing the virtual space image on the physical space image.
Figure 2:
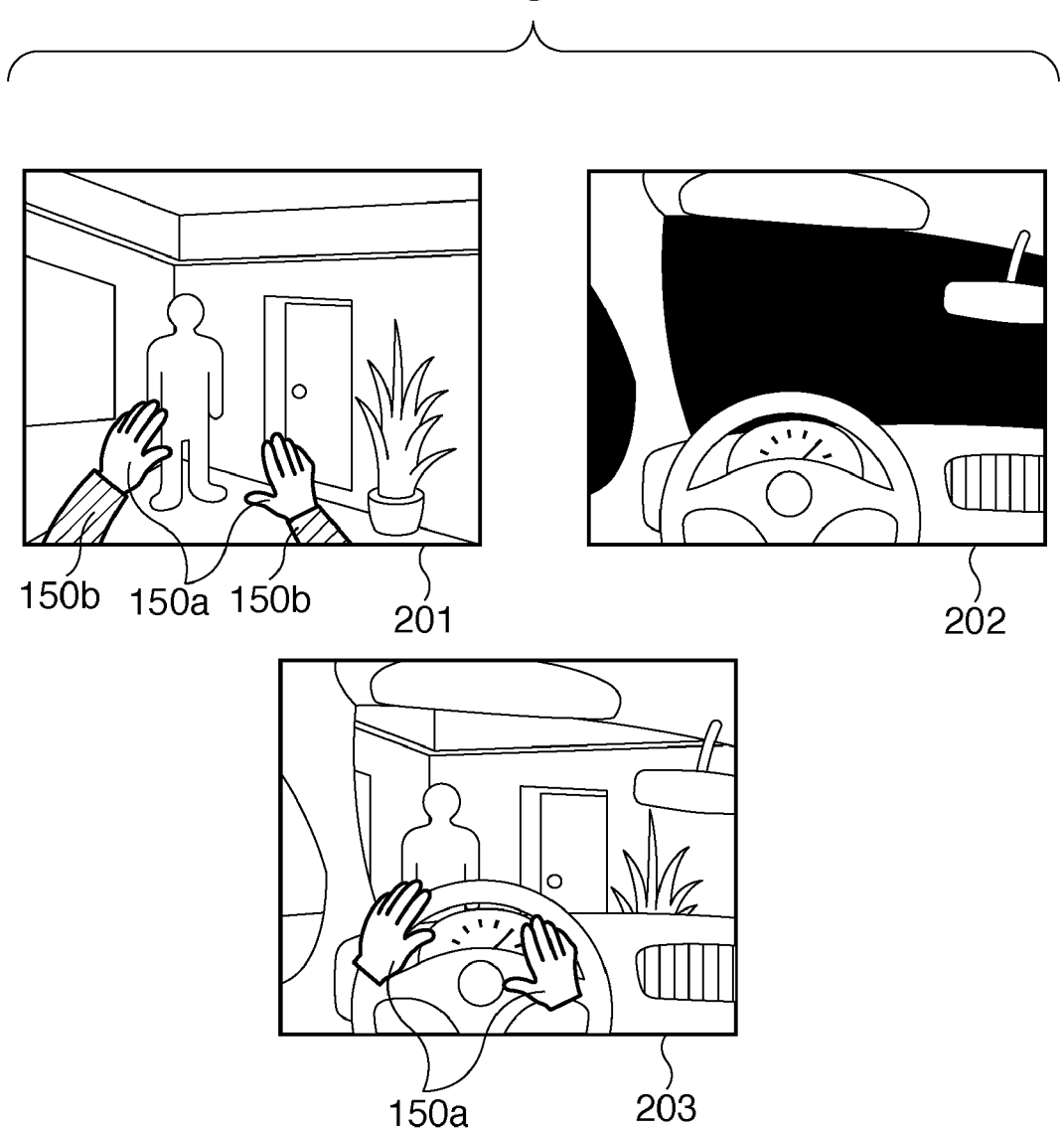
FIG. 2 is a view showing examples of a physical space image including objects having a plurality of colors, a virtual space image, and a composition image obtained by superimposing the virtual space image on the physical space image.
Figure 13:
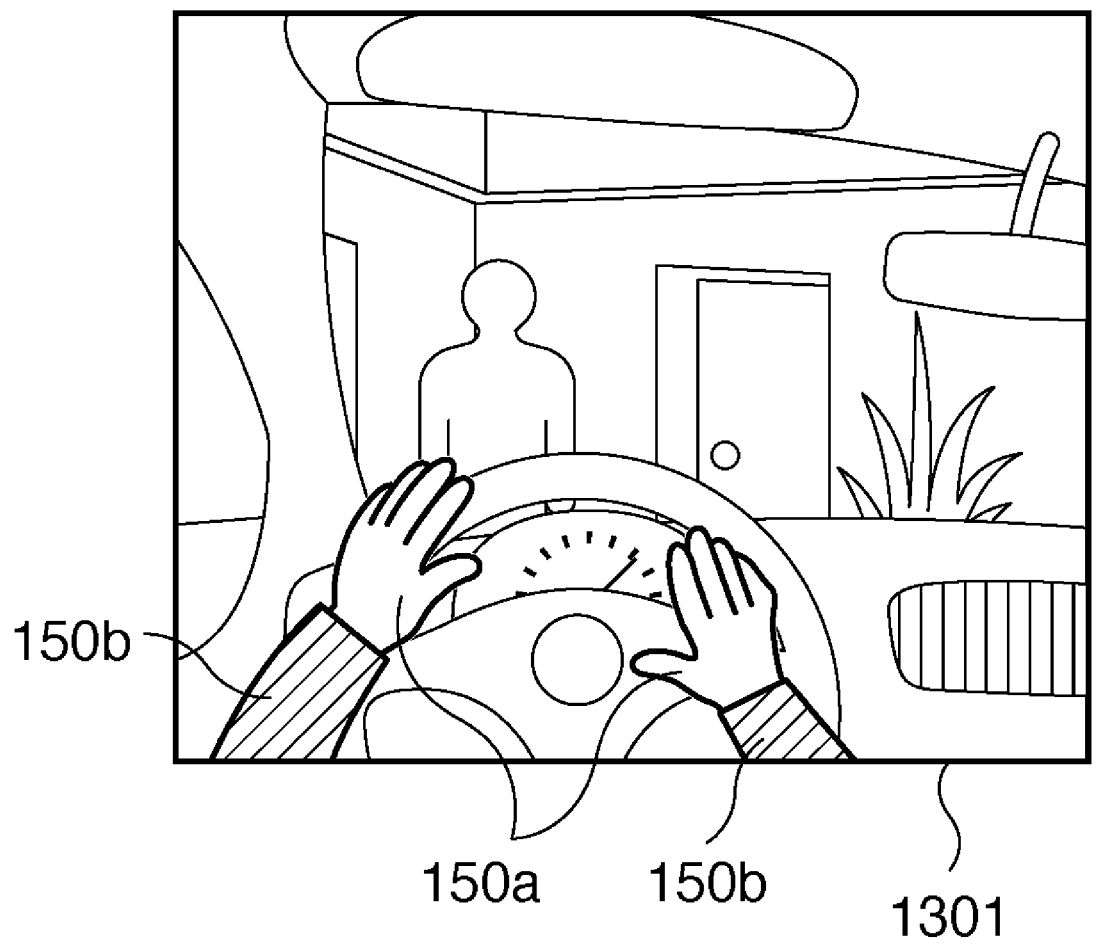
FIG. 13 is a view showing an example of a mixed reality space image generated according to the first embodiment of the present invention.

FIG. 13 is a view showing an example of the mixed reality space image generated according to this embodiment. A mixed reality space image 1301 shown in FIG. 13 is generated when the physical space image and the virtual space image are a physical space image 201 and a virtual space image 202 shown in FIG. 2. As shown in FIG. 13, both hand regions 150a and arm regions 150b having pixel values different from those of the hand regions 150a can be displayed on the foreground of the virtual space image 202.

Second Embodiment

As described at the beginning of the first embodiment, the object region is not limited to a region obtained by merging a "hand" region and an "arm" region. The object region can be formed by merging any other regions. That is, in the following description, any object region is applicable if it is displayed by a plurality of different pixel values.

For example, a physical object held in the hand of the user may be determined as an additional region to decide the object region. This makes it possible to display not only the user's hand and arm but also the physical object held in the hand on the foreground of the virtual space image.

In this case, the process in step S805 of the first embodiment is changed in the following way.

In the first embodiment, two criteria are used in step S805. In the second embodiment, one of the criteria is changed as follows.

More specifically, determining whether the additional region belongs to the region of the edge of the physical space image is eliminated. This is because the physical object held in the hand does not always belong to the edge of the physical space image.

In the second embodiment, however, determination is done based on whether the object region obtained by merging the key region with the additional region (the region determined in step S805) belongs to the edge of the physical space image.

This prevents any recognition error of a region that is not held in the hand.

Third Embodiment

In the first and second embodiments, the key region and the additional region are calculated in each frame, and the object region is decided based on them. That is, the processing of calculating the object region based on the key region and the additional region is performed for each frame. In the third embodiment, the key region and the additional region are calculated only to designate an initial region. Subsequent object region update is done by automatic outline extraction processing.

In this embodiment, it is possible to stably update an initially registered object region every time. "Stable" means that, e.g., an unchanged region can be extracted even when a new physical object included in the key region has appeared. The third embodiment is different from the first and second embodiments only in the process of step S502.

Figure 14:
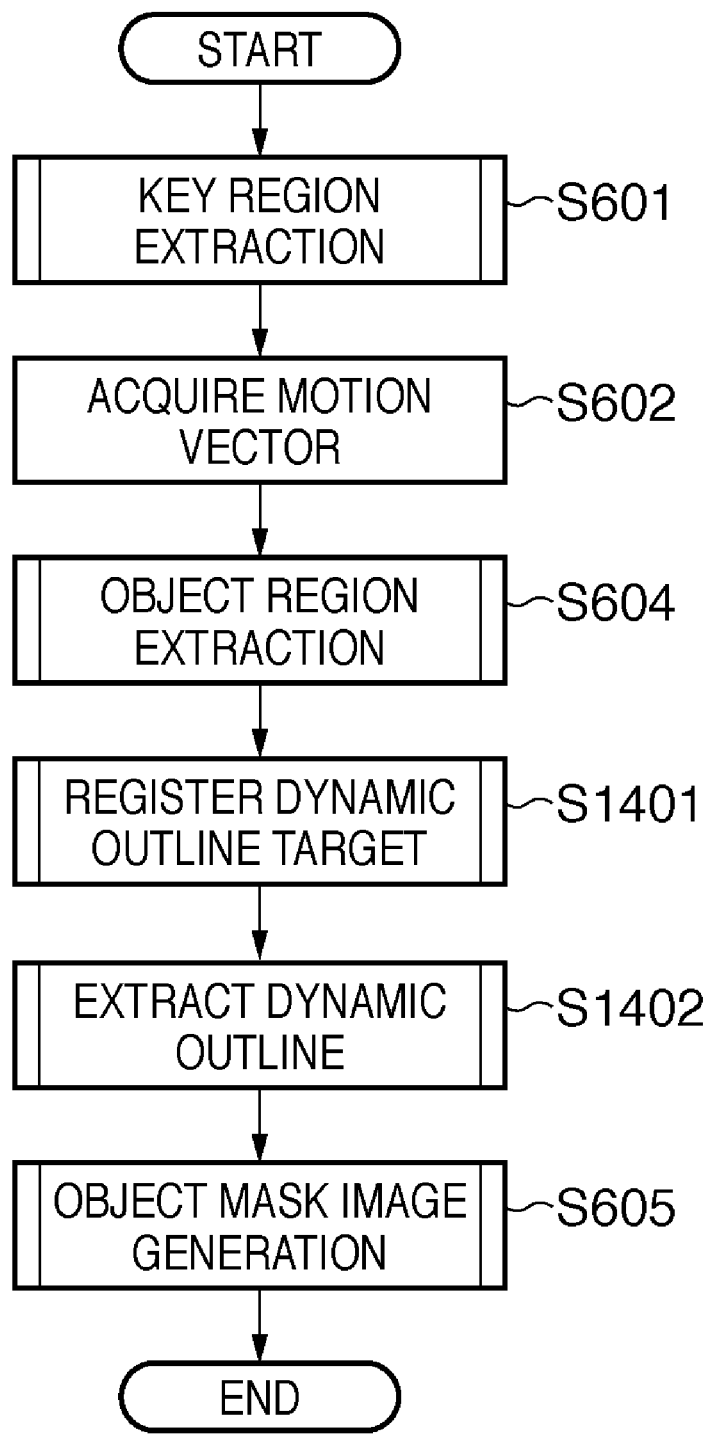
FIG. 14 is a flowchart of the process in step S502 according to the third embodiment of the present invention.

FIG. 14 is a flowchart of the process in step S502 according to this embodiment. For the flowchart shown in FIG. 14, the process in step S603 and that in step S606 are eliminated from the flowchart in FIG. 6. Instead, a dynamic outline target registration process in step S1401 and a dynamic outline extraction process in step S1402 are added between steps S604 and S605.

In step S1401, an object region detection unit 305 registers the object region extracted in step S604 as a dynamic outline extraction target.

In step S1402, the object region detection unit 305 extracts the dynamic outline of the object region registered in step S1401. The dynamic outline extraction can be done using an existing algorithm such as a snake algorithm. The dynamic outline extraction is a known technique, and a description thereof will be omitted.

In step S605, the object region detection unit 305 generates and outputs a mask image (object region data) based on the object region extracted in step S1401.

Fourth Embodiment

In the above embodiments, an object region is specified based on only motion vectors calculated from a physical space image sensed by the image sensing unit 301. However, the method of specifying an object region is not limited to this. For example, an object region may be specified based on motion vectors calculated by correcting motion vectors calculated from a physical space image using motion vectors generated from a change in the position and orientation of an image sensing unit 301.

When the image sensing unit 301 moves or rotates, an error is readily generated upon extracting an object region using motion vectors calculated from only a physical space image. This is because the motion vectors calculated from only the physical space image include not only the motion vectors of the object but also those of the image sensing unit 301. For example, when the image sensing unit 301 moves in a direction reverse to that of the object, some of the motion vectors of the object may be canceled.

To prevent this, in the fourth embodiment, the motion vectors of the object are calculated by subtracting the influence of motion vectors generated by the change in the position and orientation of the image sensing unit 301 from the motion vectors calculated from the physical space image. The object region is specified from the motion vectors as the calculation result. In this case, the process in step S502 of the first embodiment is changed as follows.

In the first embodiment, in step S502, motion vectors are calculated from only the physical space image in step S602. In the third embodiment, the motion vector calculation method is changed in the following way.

Figure 16:
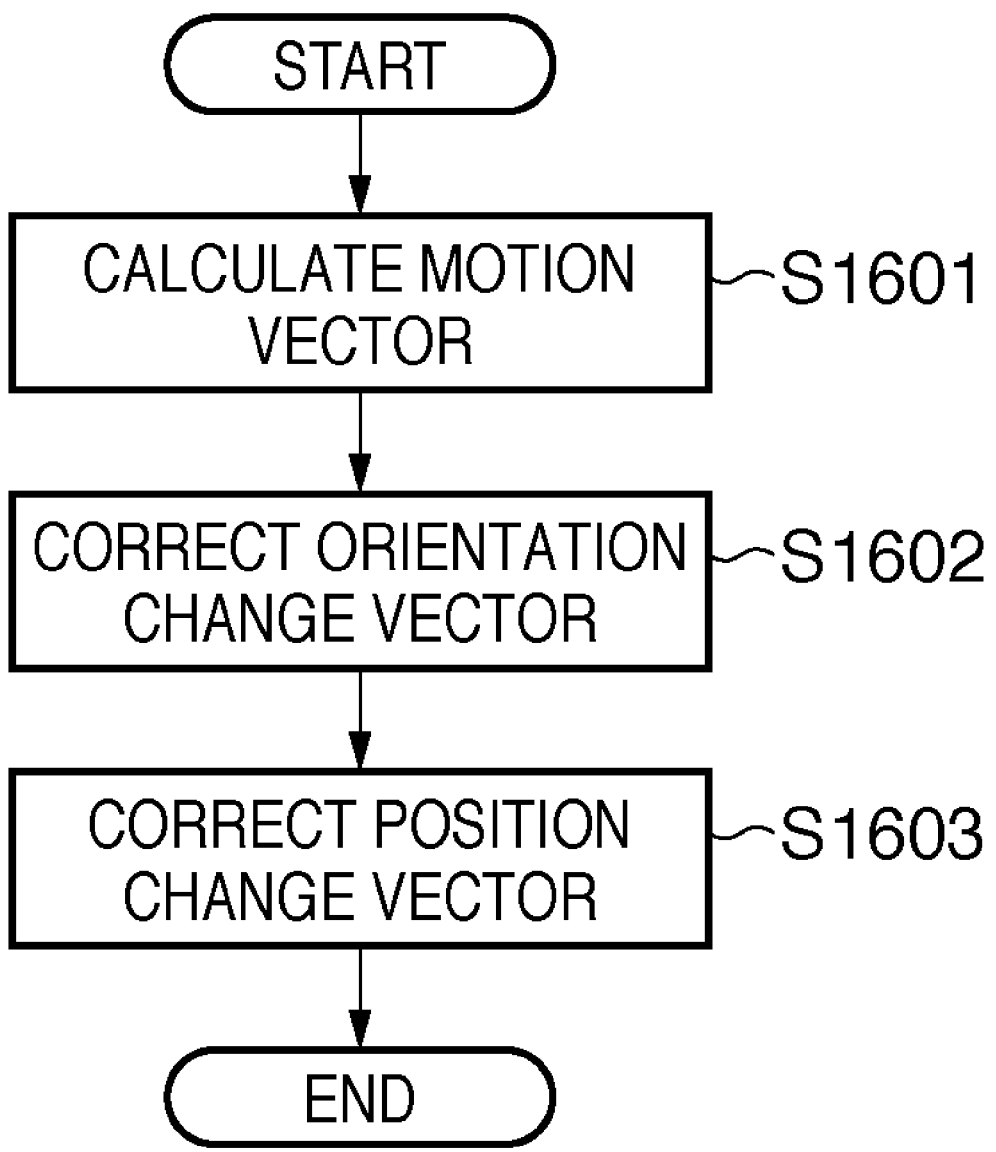
FIG. 16 is a flowchart of the process in step S602 according to the fourth embodiment of the present invention.

FIG. 16 is a flowchart of the process in step S602 according to this embodiment. In step S602 of this embodiment, the motion vectors are corrected from only the physical space image based on the position and orientation of the image sensing unit 301 (image sensing device).

In step S1601, a motion vector detection unit 304 calculates a motion vector from the physical space image. The process in step S1601 is the same as that in step S602 described in the first embodiment.

In step S1602, the motion vector detection unit 304 corrects the motion vector calculated in step S1601 using the information of the motion vector based on the orientation change of the image sensing unit 301 (orientation change motion vector).

More specifically, the motion vector detection unit 304 first calculates the orientation information of the image sensing unit 301 from a position and orientation measuring unit 306. Assume that the motion vector detection unit 304 holds the position and orientation information of the image sensing unit 301 in the preceding frame in advance. The motion vector detection unit 304 calculates the orientation change amount on the basis of the orientation information of the image sensing unit 301 in the preceding frame and that of the image sensing unit 301 in the current frame. The motion vector detection unit calculates the motion vector generated by the orientation change (orientation change motion vector) from the orientation change amount. The motion vector calculation technique is known, and a detailed description thereof will be omitted. Note that the orientation change indicates rotation of the optical axis about the lens center of the image sensing unit 301.

Next, the calculated orientation change motion vector is projected onto the image plane of the image sensing unit 301 so that it is converted into a motion vector on the image.

The motion vector detection unit 304 corrects the motion vector calculated in step S1601 using the orientation change motion vector projected onto the image plane. This correction is performed by calculating a matrix M' representing a motion vector calculated by subtracting the orientation change motion vector from the motion vector in the physical space image $$M'=M-Rv \cdot I \quad (1)$$

where M is a matrix representing the motion vector calculated from the physical space image, Rv is the orientation change vector projected onto the image plane, and I is a unit matrix (matrix having the same size as the matrix M).

In this way, the motion vector by the orientation change is subtracted from the motion vector calculated from the physical space image.

Referring back to FIG. 16, in step S1603, the motion vector detection unit 304 corrects the motion vector calculated in step S1601 using the information of the motion vector based on the position change of the image sensing unit 301 (position change motion vector).

More specifically, the motion vector detection unit 304 first calculates the position information of the image sensing unit 301 from the position and orientation measuring unit 306. The motion vector detection unit 304 calculates the position change amount on the basis of the position information of the image sensing unit 301 in the preceding frame and that of the image sensing unit 301 in the current frame. The motion vector detection unit calculates the motion vector generated by the position change from the position change amount. Note that the position change indicates a position change when the image sensing unit 301 is translated about its lens center.

Next, the position change motion vector is projected onto the image plane of the image sensing unit 301 so that it is converted into a motion vector on the image. In projecting the position change motion vector onto the image plane, depth information up to the object must be taken into consideration, unlike image plane projection of the orientation change motion vector. This is because the position change motion vector projected onto the image plane changes depending on the depth distance to the object. More specifically, as the distance to the object increases, the magnitude of the position change motion vector becomes large.

Hence, the motion vector detection unit 304 measures the depth distance to the object to calculate the position change motion vector to be projected onto the image plane.

In this embodiment, since the object is sensed by the HMD 390 including a stereoscopic video camera, the depth distance is measured by stereo matching. The stereo matching method is a known technique, and a description thereof will be omitted.

In this embodiment, the depth distance is measured by stereo matching. However, the present invention is not limited to this method. For example, the depth distance may be measured using an infrared distance measuring camera. That is, any method capable of measuring the distance is usable. Alternatively, the user may set the depth distance to calculate the position change motion vector.

When the depth distance is measured, the motion vector detection unit 304 calculates the position change motion vector to be projected onto the image plane by the position change motion vector Tv projected onto the image plane $$Tv = f \cdot t / z \quad (2)$$

where f is the distance from the lens to the imaging plane of the image sensing unit 301, t is the motion vector generated by the position change of the image sensing unit 301, and z is the depth distance to the object.

Figure 17:
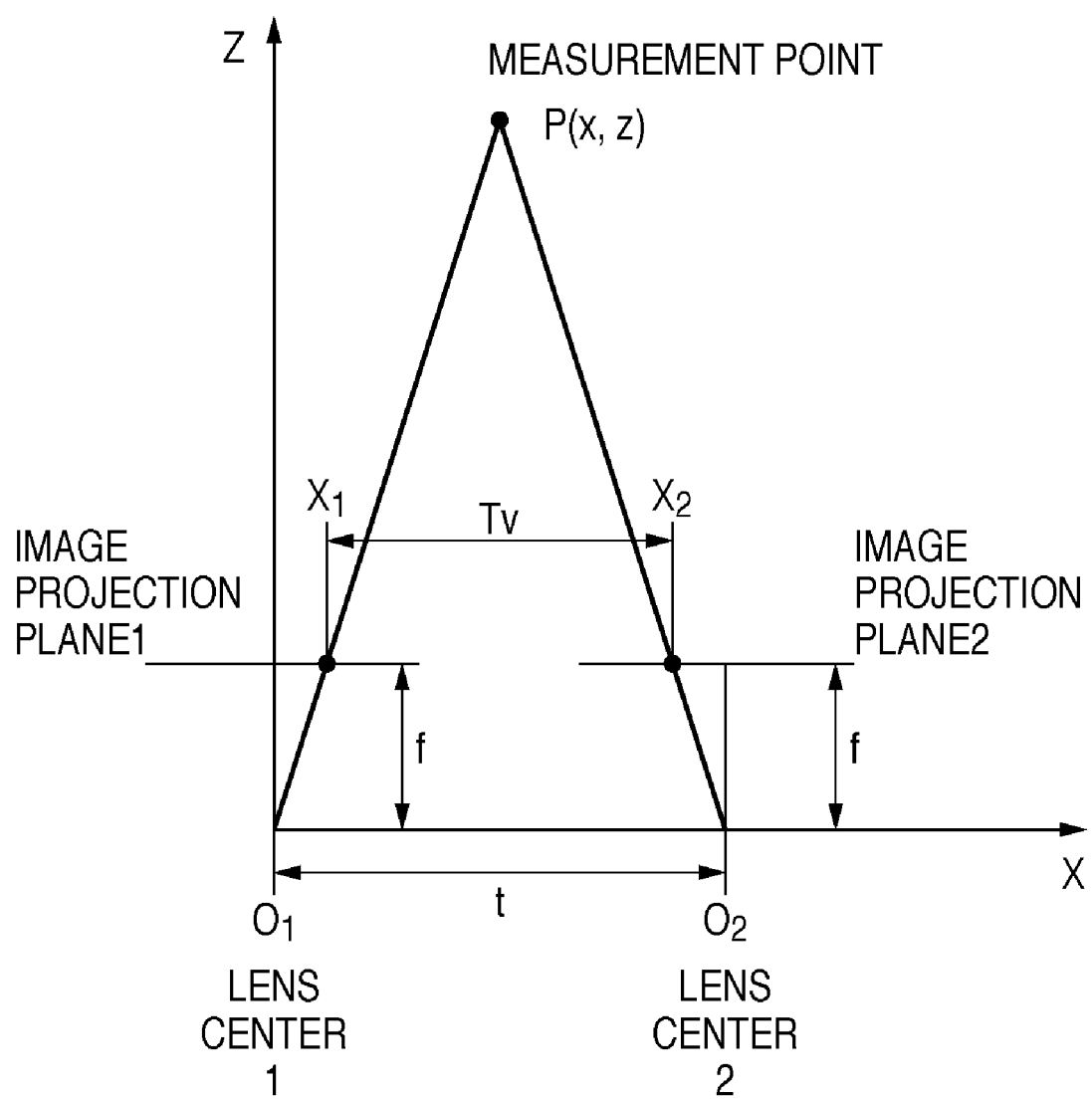
FIG. 17 is a graph showing a principle of calculating a position change motion vector Tv projected onto an image plane.

FIG. 17 is a graph showing a principle of calculating the position change motion vector Tv projected onto the image plane. FIG. 17 shows an example in which the image sensing unit 301 has translated (translated by t) when the immediately preceding frame changed to the current frame (the object is fixed). In the example shown in FIG. 17, the image sensing unit 301 translates in the x-axis direction of the X and Y coordinate axes that define the image plane. In this case, motion only in the x-axis direction is assumed for the descriptive convenience. However, the principle of the method to be described here is also applicable when the moving direction has the y-axis component.

Referring to FIG. 17, $O_1$ is the lens center of the image sensing unit 301 in the frame (preceding frame) immediately preceding to the current frame, $O_2$ is the lens center of the image sensing unit 301 in the current frame (current frame), P(x,z) is a point (measurement point) of the object sensed by the image sensing unit 301, x is the value of the x-coordinate, and z is the value of the z-coordinate. The coordinate system expressed here is the coordinate system of the physical space having its origin at the lens center of the image sensing unit 301 in the preceding frame. That is, z is the depth value from the image sensing unit 301.

$X_1$ is the x-coordinate when the measurement point in the preceding frame is projected onto the image plane, and $X_2$ is the x-coordinate when the measurement point in the current frame is projected onto the image plane. That is, $X_2-X_1$ is the motion vector of the image sensing unit 301 on the image plane. The remaining portions are the same as in equation (2).

As is apparent from FIG. 17, when the position change motion vector t is given, it is possible to calculate the position change motion vector Tv on the image plane based on the similarity relationship between the distance f from the lens to the imaging plane of the image sensing unit 301 and the distance z to the object.

The motion vector detection unit 304 corrects the motion vector calculated in step S1601 using the position change motion vector projected onto the image plane. This correction is performed by a matrix M″ representing a motion vector calculated by subtracting the position change motion vector from the motion vector M′

$$M''=M'-Tv \cdot I$$

where M′ is a matrix representing the motion vector corrected by the process in step S1602, Tv is the position change vector projected onto the image plane, and I is a unit matrix (matrix having the same size as the matrix M). In this way, the motion vector by the position change of the image sensing unit 301 is subtracted from the motion vector calculated from the physical space image.

Finally, the motion vector generated based on the position and orientation of the image sensing unit 301 is subtracted from the motion vector calculated from the physical space image sensed by the image sensing unit 301. Consequently, the motion vector of the object from which the motion vector by the image sensing unit 301 is eliminated is calculated.

In this embodiment, the object region is specified based on the motion vectors calculated by correcting the influence of the motion of the image sensing unit 301 in the above-described way. In this embodiment, motion vectors generated by the changes in both the position and orientation are corrected. However, the motion vector correction may be done in consideration of only the orientation change or only the position change of the image sensing unit 301.

In this embodiment, a motion vector generated by the motion of the image sensing unit 301 is calculated using position and orientation information calculated from the position and orientation measuring unit 306. However, the motion vector may be calculated by another method. That is, the motion vector need not always be calculated based on the position and orientation information calculated from the sensor system such as a magnetic sensor or an optical sensor. For example, the motion vector generated by the motion of the image sensing unit 301 may be calculated using an image sensed by the image sensing unit 301.

For example, the average of motion vectors in an entire frame sensed by the image sensing unit 301 may be assumed to be the motion vector generated by the motion of the image sensing unit 301. If the background region is known upon region segmentation of the sensed image, a motion vector generated in the background region may be assumed to be the motion vector generated by the motion of the image sensing unit 301.

Fifth Embodiment

In the above-described embodiments, the units included in the image processing apparatus 300 shown in FIG. 3 are formed from hardware. However, the units except the storage device 310 and the sensed image receiving unit 302 may be implemented as a software program. In this case, the software program is installed in a computer having a storage device 310 and a sensed image receiving unit 302. The CPU of the computer executes the software program, thereby implementing the operations of the units. That is, a computer such as a general PC (personal computer) is applicable to an image processing apparatus 300.

Figure 15:
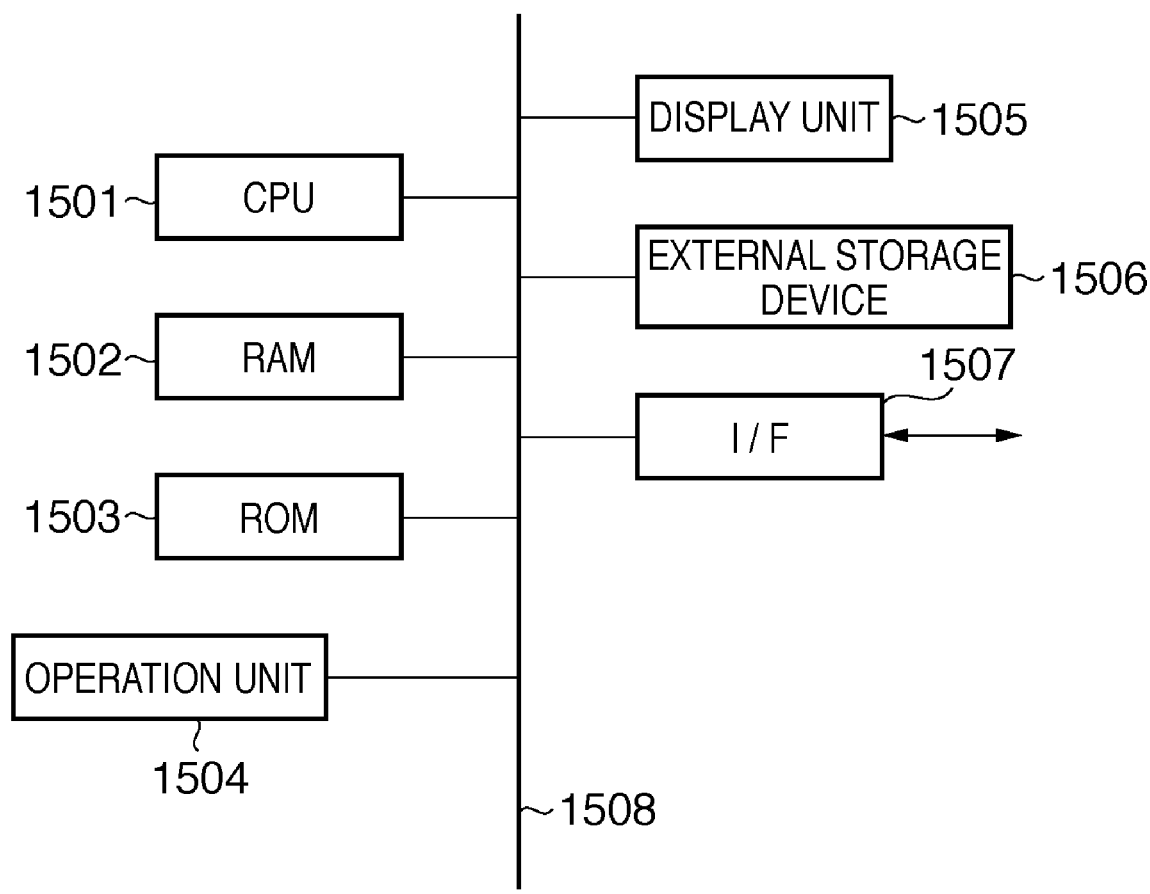
FIG. 15 is a block diagram showing an example of the hardware configuration of a computer applicable to an image processing apparatus 300.

FIG. 15 is a block diagram showing an example of the hardware configuration of a computer applicable to the image processing apparatus 300.

A CPU 1501 controls the entire computer using programs and data stored in a RAM 1502 and a ROM 1503 and also executes the above-described processing of the image processing apparatus 300.

The RAM 1502 has an area to temporarily store programs and data loaded from an external storage device 1506 or various kinds of data externally received via an I/F (interface) 1507. The RAM 1502 also has a work area to be used by the CPU 1501 to execute various kinds of processing. The RAM 1502 also serves as the frame memory or stencil buffer. That is, the RAM 1502 can provide various areas as needed.

The ROM 1503 stores the set data and boot program of the computer.

An operation unit 1504 includes a keyboard and a mouse. The operator of the computer can input various instructions to the CPU 1501 by operating the operation unit 1504. For example, a process end instruction can be input using the operation unit 1504.

A display unit 1505 including a CRT or a liquid crystal panel can display the processing result of the CPU 1501 as an image or a text. The display unit can display, e.g., a mixed reality space image generated by causing the computer (CPU 1501) to execute the above-described processing of the image processing apparatus 300. The external storage device 1506 is a mass information storage device represented by a hard disk drive. The external storage device 1506 stores the OS (Operating System), and programs and data which cause the CPU 1501 to execute the above-described processing of the image processing apparatus 300. The programs include a program for causing the CPU 1501 to execute the functions of a motion vector detection unit 304, key region extraction unit 303, object region detection unit 305, image composition unit 308, and image generation unit 307. The external storage device 1506 also serves as the storage device 310. The programs and data stored in the external storage device 1506 are loaded to the RAM 1502 as needed under the control of the CPU 1501. The CPU 1501 executes processing using the loaded programs and data. Hence, the computer can execute the above-described processing of the image processing apparatus 300.

The I/F 1507 connects an HMD 390 and a position and orientation measuring unit 306 described above to the computer. The computer transmits/receives signals to/from the HMD 390 or position and orientation measuring unit 306 via the I/F 1507. The I/F 1507 also serves as the sensed image receiving unit 302.

A bus 1508 connects the above-described units.

The hardware configuration of the computer applicable to the image processing apparatus 300 is not limited to that shown in FIG. 15. For example, a graphics card (board) attached to the computer may generate a virtual space image or a mixed reality space image.

Other Embodiments

The object of the present invention is also achieved by the following method. A recording medium (or storage medium) which records software program codes to implement the functions of the above-described embodiments is supplied to a system or apparatus. The storage medium is a computer-readable storage medium, as a matter of course. The computer (or CPU or MPU) of the system or apparatus reads out and executes the program codes stored in the recording medium. In this case, the program codes read out from the recording medium themselves implement the functions of the above-described embodiments. The recording medium that stores the program codes constitutes the present invention.

The functions of the above-described embodiments are also implemented when the computer executes the readout program codes, and the operating system (OS) running on the computer partially or wholly executes actual processing on the basis of the instructions of the program codes.

Assume that the program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-282352, filed Oct. 30, 2007 and Japanese Patent Application No. 2008-186501, filed Jul. 17, 2008, which are hereby incorporated by reference herein in their entirety.

What is claimed is:

1. An image processing apparatus comprising:
   a unit which acquires a physical space image;
   an extraction unit which extracts a first region including pixels having a predetermined pixel value in the physical space image;
   a calculation unit which calculates a motion vector of an object in the physical space image;
   a specifying unit which specifies, using the motion vector, a second region that moves together with the first region;
   a generation unit which generates a virtual space image; and
   a superimposition unit which superimposes the virtual space image on a region different from the first region and the second region in the physical space image.

2. The apparatus according to claim 1, wherein said extraction unit extracts, as the first region, a region including pixels having a pixel value representing a color of a hand in the physical space image.

3. The apparatus according to claim 1, wherein said calculation unit calculates the motion vector for each pixel included in the physical space image.

4. The apparatus according to claim 1, wherein said specifying unit comprises a first unit which specifies, as the second region, a region corresponding to, of motion vectors calculated by said calculation unit for regions other than the first region, a motion vector similar to a feature of a motion vector calculated by said calculation unit for the first region.

5. The apparatus according to claim 4, wherein said specifying unit determines whether a magnitude of a representative motion vector decided based on the motion vectors calculated by said calculation unit for the other regions is not less than a predetermined magnitude, and applies said first unit to a region where the magnitude of the representative motion vector is not less than the predetermined magnitude.

6. The apparatus according to claim 1, wherein said specifying unit comprises a first unit which specifies, as the second region on the basis of a position in the physical space image and a connection relationship to the first region, a region corresponding to, of motion vectors calculated by said calculation unit for regions other than the first region, a motion vector similar to a feature of a motion vector calculated by said calculation unit for the first region.

7. The apparatus according to claim 1, wherein said calculation unit comprises:
   a unit which calculates an orientation change amount of an image sensing device;
   a unit which calculates, as an orientation change motion vector based on the orientation change amount, a motion vector generated by an orientation change of the image sensing device; and
   a unit which corrects the motion vector based on the orientation change motion vector.

8. The apparatus according to claim 1, wherein said calculation unit comprises:
   a unit which calculates depth information of physical space;
   a unit which calculates a position change amount of an image sensing device;
   a unit which calculates, as a position change motion vector based on the depth information and the position change amount, a motion vector generated by a position change of the image sensing device; and
   a unit which corrects the motion vector based on the position change motion vector.

9. The apparatus according to claim 1, wherein said generation unit generates the virtual space image based on position and orientation information representing a position and orientation of an image sensing device that has sensed the physical space image.

10. The apparatus according to claim 1, further comprising a unit which outputs a composition image obtained by superimposition processing of said superimposition unit.

11. An image processing method comprising:
   a step of acquiring a physical space image;
   an extracting step of extracting a first region including pixels having a predetermined pixel value in the physical space image;
   a calculating step of calculating a motion vector of an object in the physical space image;
   a specifying step of specifying, using the motion vector, a second region that moves together with the first region;
   a generating step of generating a virtual space image; and
   a superimposing step of superimposing the virtual space image on a region different from the first region and the second region in the physical space image.

12. A non-transitory computer-readable storage medium storing a computer program which causes a computer to execute:
   a step of acquiring a physical space image;
   an extracting step of extracting a first region including pixels having a predetermined pixel value in the physical space image;
   a calculating step of calculating a motion vector of an object in the physical space image;
   a specifying step of specifying, using the motion vector, a second region that moves together with the first region;
   a generating step of generating a virtual space image; and
   a superimposing step of superimposing the virtual space image on a region different from the first region and the second region in the physical space image.

* * * * *